US012566087B2

(12) United States Patent          (10) Patent No.:    US 12,566,087 B2

Gottfriedsen et al.          (45) Date of Patent:       Mar. 3, 2026

| | | | | |
|---|---|---|---|---|
| (54) | SCALE WITH OVERLOAD DETECTION | | | |

(71)  Applicant: Wipotec GmbH, Kaiserslautern (DE)

(72)  Inventors: Jan Gottfriedsen, Waldfischbach-Burgalben (DE); Frank Schmitt, Mittelbrunn (DE)

(73)  Assignee: Wipotec GmbH, Kaiserslautern (DE)

( * )  Notice:  Subject to any disclaimer, the term of this patent is extended or adjusted under 35 U.S.C. 154(b) by 377 days.

(21)  Appl. No.: 18/207,799

(22)  Filed:  Jun. 9, 2023

(65)          Prior Publication Data

US 2024/0142295 A1      May 2, 2024

(30)          Foreign Application Priority Data

Jun. 10, 2022    (DE) ..................... 10 2022 114 697.9

(51)  Int. Cl.
     *G01G 7/04*          (2006.01)
(52)  U.S. Cl.
     CPC ..................................... *G01G 7/04* (2013.01)
(58)  Field of Classification Search
     CPC ...................... G01G 7/02–045; G01G 23/005
     See application file for complete search history.

(56)          References Cited

U.S. PATENT DOCUMENTS

| | | | | | |
|---|---|---|---|---|---|
| 4,149,605 | A | * | 4/1979 | Mettler | ............... G01G 23/3721 177/DIG. 3 |
| 4,420,055 | A | * | 12/1983 | Grutzediek | ............ G01G 7/045 177/212 |
| 5,184,690 | A | * | 2/1993 | Komoto | ................. G01G 23/00 177/210 EM |
| 2018/0058908 | A1 | * | 3/2018 | Nagane | .................. G01G 23/01 |
| 2020/0217709 | A1 | * | 7/2020 | Schulzki | ............. G01G 23/005 |

FOREIGN PATENT DOCUMENTS

| | | |
|---|---|---|
| JP | S57211021 A | 12/1982 |
| JP | S58062524 A | 4/1983 |
| JP | S61147116 A | 7/1986 |
| JP | S63088407 A | 4/1988 |
| JP | 2020109402 A | 7/2020 |

OTHER PUBLICATIONS

Machine translation of JP 61-147116 (Year: 1986).*
Extended European Search Report issued Nov. 13, 2023 in EP Application No. 23175802.0.
Japanese patent application No. 2023-090074 JPO decision of refusal issued Jan. 8, 2025.
Japanese patent application No. 2023-090074 JPO first Office Action issued Jul. 23, 2024.

* cited by examiner

*Primary Examiner* — Natalie Huls

(74) *Attorney, Agent, or Firm* — Calvert Technology Law, PLLC; Nathan H. Calvert

(57)          ABSTRACT

The disclosure relates to a scale operating according to the principle of electrodynamic force compensation and to a method for its operation. An automatic switchover from a measuring mode to an overload mode is provided for detecting overload forces. In this overload mode the load resistance formed by a coil and at least one measuring resistor is reduced in order to allow a higher coil current at the same output stage power.

20 Claims, 4 Drawing Sheets

SCALE WITH OVERLOAD DETECTION

TECHNICAL FIELD OF THE INVENTION

The present invention relates to scales which operate according to the principle of electrodynamic force compensation. More particularly, the present invention relates to scales and methods capable of better characterizing overload occurrences.

BACKGROUND OF THE INVENTION

In scales that operate according to the principle of electrodynamic force compensation a force introduced into a load cell via a load receptor is compensated with the help of an electric coil and a magnet interacting with the coil. The current required for this force compensation and flowing through the coil is a measure of the force and is therefore measured. To measure the coil current, it can be passed through a measuring resistor, for example, that produces a voltage drop dependent on the current. This voltage can be further processed for evaluation, for example by feeding it—possibly filtered and/or amplified and/or otherwise pre-treated—to a first A/D converter and, in conjunction with an associated control unit, converting it into a display value corresponding to the compensated force.

The coil current conducted through the coil is supplied by an output stage, which provides a regulated output voltage. The output voltage is regulated with the help of a position sensor. This detects relative movements between the coil and the magnet in relation to a defined rest position, which relative movements depend on the magnitude of the force to be measured. The controller regulates the output voltage of the output stage in such a way that the resulting current conducted through the coil compensates for the relative movement through electrodynamic interaction with the magnet and the coil and magnet are moved back into the rest position relative to each other and against the acting force. As a rule, the force to be measured acts on the coil directly (direct bearing systems) or via one or more levers, while the magnet is held stationary. However, other or reversed solutions are also possible.

The current to be supplied by the output stage thus depends on the magnitude of the force to be compensated and increases accordingly as the force increases. For regular weighing operation (also referred to as measuring mode "m" in the following), the load cell is set to a predefined load range, which is determined, for example, by the capacity of the output stage or the load measuring range of the first A/D converter and is based on which forces $F_m$ can reasonably be expected and compensated for. If a force acting on the load cell is outside (in particular above) this load range (also referred to as overload "u" in the following), then a) the voltage of the measuring resistor associated with the coil current exceeds the load measuring range provided at the first A/D converter, and/or b) the output stage's capacity is no longer sufficient to supply the necessary compensation current to the coil. The relative movement can no longer be compensated and the coil current dropping at the measuring resistor is no longer a correct measure of the force introduced into the load receptor.

Overloading of the scale can occur frequently in practice, for example because a gripper/pusher/operator applies the measured object too hard or too fast, abruptly or with too much force to the scale. This can damage the load cell and impair its service life, but this is not initially apparent to the scale. Furthermore, for legal metrological reasons, it is not admissible to output weight readings above a designated load measuring range. This could be prevented by stopping the output of the weight measurement value when an upper threshold value selected within the load measurement range is exceeded. However, no more precise information about the type of overload can be derived from this. However, when estimating the service life of a gravimetric measuring device, the type, amount, frequency and temporal sequence of the overloads are particularly important.

SUMMARY OF THE INVENTION

An object of the invention is to provide a scale and method that facilitates a more accurate analysis of overload conditions.

The invention is based on the realisation that for a more accurate analysis of overloads, their actual magnitude should also be recorded. As shown above, this is not possible in the prior art if the intended load measuring range of the first A/D converter used is exceeded and/or the power of the output stage with the specified coil and measuring resistor configuration is not sufficient to supply the compensation coil current required for the overload.

According to a first aspect of the invention, the above object is achieved by switching the scale to an overload mode when an overload occurs or when a threshold value indicating this overload is reached. For this purpose, the electrical load resistance $R_W$ formed by the coil (sometimes referred to herein as the "carrying coil") and a measuring resistor arrangement comprising at least one measuring resistor is changed, in particular reduced. This change may be done automatically. Furthermore, the change is advantageously carried out in fractions of a second with the aid of a control unit which carries out suitable switching measures in the scale electronics. By reducing the electrical load resistance, the overall electrical resistance to the coil current is reduced, so that a reduced voltage is sufficient to maintain the same coil current, for example. Accordingly, the output stage voltage $U_E$ regulated at the output stage and thus the power required from the output stage is reduced. In other words, in order to be able to supply a certain coil current $I_L$, a lower output stage voltage with correspondingly lower power $P = U_E \cdot I_L$ is sufficient according to $U_E = I_L \cdot R_W$ with reduced load resistance. This in turn means that the output stage in overload mode (i.e. with reduced load resistance $R_W$) is capable of supplying a higher coil current using its entire capacity than would be possible with the higher electrical load resistance acting in measuring mode—the load capacity of the system is thus increased according to the invention by switching to overload mode. Under these circumstances, even with a force outside the load range intended for regular operation, a coil current can be supplied that correctly represents this load. The change from regular operation in measuring mode to overload mode may take place in order to minimise or completely avoid the movement of the coil relative to the magnet during an overload and to be able to determine a measured value corresponding to the overload. Advantageously, the already existing measuring system of the scale, in particular its output stage, can be used almost unchanged for this purpose. In particular, there is no need for a switchable current source that has to be switched between a higher and lower power depending on the load case. Instead, any output stage can be used for which the power is sufficient to supply a sufficiently high compensation current even in an overload situation.

The reduction of the load resistance $R_W$ may be accomplished by reducing the electrical resistance $R_{W1}$ (measuring electrical resistance) of the measuring resistor $W_1$ at which the voltage for the evaluation of the coil current $I_L$ is tapped and fed to a first A/D converter, for example. If this electrical resistance $R_{W1}$ is reduced, the measuring resistor voltage $U_{W1}$ dropping across it is also reduced with the result that a load measuring range overrun of the A/D converter can be avoided even in the case of overload and a measured value associated with the overload force can be determined with the existing first A/D converter.

Reducing the electrical resistance of the measuring resistor overcomes the obstacle that a large electrical measuring resistance $R_{W1}$ generates a correspondingly large measuring resistor voltage $U_{W1}$, with correspondingly possible high resolution or display accuracy for the voltages recorded within the regular load measuring range. In regular operation or measuring mode (m), this high resolution is of interest in order to be able to output accurate weight values. For the overload mode, however, this first aspect of the invention turns away from this requirement and thereby enables the extension of the load capacity of the scale and/or the evaluation of overload forces.

In some implementations of the invention, an existing measuring system intended for a predetermined "regular" load measuring range or measuring mode (measuring mode "m") can therefore be used in a very simple way to quantitatively determine forces outside the intended load measuring range (overload force). The reduction of the measuring resistance $W_1$ can be prepared and implemented in a very simple way, which will be described below.

A scale according to the first aspect of the invention is designed to determine a force $F_m$, $F_u$ acting on the scale and operates according to the principle of electrodynamic force compensation (which is sometimes also referred to as electromagnetic force compensation). Such a scale comprises a carrying coil L and a magnet G interacting with the carrying coil L and movable relative to it. A carrying coil current $I_L$ can be supplied to the carrying coil L from an output stage E in order to compensate the force by electrodynamic interaction between coil L and magnet G and to be able to evaluate the coil current $I_L$ to determine the force.

A scale in accordance with the first aspect of the invention further comprises a resistor arrangement W, which forms a load resistor with an electrical resistance $R_W$ for a load coil circuit fed by the output stage E. The resistor arrangement W comprises at least the carrying coil L with its electrical resistance $R_L$ and a measuring resistor arrangement having at least one measuring resistor $W_1$ with its electrical resistance $R_{W1}$. The carrying coil can also be formed from several partial coils.

Implementations of a scale in accordance with the invention are designed to determine a measured value associated with the respective force $F_m$ in a measuring mode (m) for forces $F_m$ within a predefined load range from a measuring resistor voltage $U_{W1}$ drop across the measuring resistor $W_1$. Such a scale is also designed to switch from the measuring mode (m) to an overload mode (u) for quantitative detection of the overload force $F_u$ in the event of overload forces $F_u$ exceeding the predefined load range (overload). This is done by reducing the electrical load resistance $R_W$ from its measuring mode resistance value in case of overload (load resistance reduction) and the output stage E supplies the carrying coil L with an overload coil current $I_{Lu}$ compensating the overload force $F_u$. "Overload force" here refers to the total force acting on the load cell, which is composed of the portion within the intended load measuring range and the portion above or below this load measuring range. Preferably, the switching from the measuring mode to the overload mode and/or back is carried out automatically.

The occurrence of an overload force or the necessity to switch to the overload mode (u) can be detected, for example, by the fact that the measuring resistor voltage $U_{W1}$ exceeds a predefinable upper threshold value of the load measuring range $B_{A1}$ of the first AD converter $A_1$. This threshold value can lie within the load measuring range $B_{A1}$ with a predefinable distance to the load measuring range edge. However, a criterion may also be that the measuring resistor voltage reaches the limit of the load measuring range $B_{A1}$.

The overload force can also be quantitatively determined with the first A/D converter used in the measuring mode by feeding it—just as in the measuring mode—the voltage drop across the measuring resistor for evaluation also in the overload mode (u). If the load resistance $R_W$ is reduced by reducing the measuring resistance $R_{W1}$, the voltage drop across the measuring resistor $W_1$ is also reduced. Depending on the value of the changed electrical resistance $R_{W1}$, it can then remain within the intended load measuring range of the first A/D converter despite higher coil current due to overload. In fact, the reduction of the measuring resistance results in an extension of the load measuring range for the voltage $U_{W1}$ tapped at the measuring resistor $W_1$ and fed to the first A/D converter with correspondingly lower resolution. Here is an example:

If a force $F_u$ (overload force) above the intended load range is applied to the load cell in the regular measuring mode, the coil current supplied by the regulated output stage first increases in order to generate the required compensation force between the coil and the magnet. If the measuring resistor voltage $U_{W1}$ tapped at the measuring resistor $W_1$ reaches a predetermined threshold value signalling an overload, the electrical resistance $R_{W1}$ of the measuring resistor $W_1$ could, for example, be reduced automatically and as immediately as possible by 50%. The force $F_m$, $F_u$ and thus also the required compensation coil current $I_L$ does not change immediately at the moment of the switchover, but as a result of the resistance reduction; the measuring resistance voltage drop at the measuring resistor is now also reduced by 50%. The first A/D converter connected to the measuring resistor can therefore continue to operate within its intended load measuring range. Knowing the switchover to overload mode, the value now output by the A/D converter would have to be multiplied by a factor of 2 to calculate a measured value corresponding to the overload. If the overload force $F_u$ continues to increase, the output stage can supply the required compensation current without difficulty due to the reduced measuring resistance (in the example mentioned, approximately up to twice the possible compensation current in the measuring mode, wherein the electrical resistance of the coil and other components has not been taken into account here for the sake of simplicity and the measuring resistor $W_1$ forms the essential electrical resistance of the resistor arrangement W here).

If the load cell is unloaded again to such an extent that a predetermined lower threshold value of the load measuring range $B_{A1}$ of the first A/D converter $A_1$ is undershot, this can be used as a criterion for returning to the measuring mode, whereupon the measuring resistor $W_1$ is changed back to its original electrical resistance value $R_{W1}$.

Instead of using the first A/D converter, the requirement for switching to overload mode can also be detected with the aid of a second A/D converter with a load measuring range $B_{A2}$ that is independent of the first A/D converter. This second A/D converter $A_2$ with a load measuring range ($B_{A2}$) can be supplied in the measuring mode (m) with an auxiliary voltage ($U_H$) tapped at the resistor arrangement (W) in order to trigger the switchover to the overload mode or back to the measuring mode when a predetermined upper threshold value is exceeded or when a predetermined lower threshold value is not reached. The tapped voltage can be the measuring resistor voltage $U_{W1}$ or another auxiliary voltage $U_H$ that varies depending on the coil current. The quantitative value of the overload force can also be determined using the second A/D converter instead of the first. The use of a second A/D converter independent of the first A/D converter has several advantages:

The second A/D converter can be supplied with any coil current-dependent auxiliary voltage $U_H$ tapped at the resistor arrangement—it does not have to be the resistor voltage $U_{W1}$. For example, at an additional resistor $W_2$ arranged in the suspension coil circuit, the additional resistor voltage $U_{W2}$ drop therefrom could be supplied as auxiliary voltage $U_H$ to the second A/D converter. If the electrical resistance $R_{W2}$ of this additional resistor is not changed when switching between measuring mode and overload mode, it supplies a voltage representing the coil current $I_L$ independently of the operating mode, which can be continuously evaluated to determine the coil current or the respective effective force.

The second A/D converter can include a load measuring range that is adjacent to or partially or completely encompasses the load measuring range of the first A/D converter. Thus, an overload force could be determined with the second A/D converter that lies outside the load measuring range of the first A/D converter.

The criterion for switching from the measuring mode to the overload mode and back can be determined exclusively by evaluating the second A/D converter, whereas the first A/D converter is used exclusively for determining forces in the measuring mode with a load measuring range tailored to it, (incidentally, it is also possible to check the switching requirement from the measuring mode (m) to the overload mode (u) with a first A/D converter and the criterion for switching back to the measuring mode (m) with the aid of a second A/D converter, for example by means of threshold values determined there in each case).

Some implementations of the invention (described below in connection with FIG. 4) accordingly provide that the voltage tapped at the measuring resistor in the measuring mode (m) is fed to a first A/D converter for processing or evaluation, while a second A/D converter separate from the first A/D converter is used for this purpose in the overload mode (u). The second A/D converter is supplied with a voltage which is tapped at an additional resistor different from the measuring resistor. Preferably, the additional resistor does not include the coil. Furthermore, the electrical resistance $R_{W2}$ of the additional resistor is preferably much smaller than the electrical resistance $R_{W1}$ of the measuring resistor $R_1$ (the electrical resistance $R_{W1}$ of the measuring resistor $R_1$ can, for example, be 20, 50 or 100 times as large as the electrical resistance $R_{W2}$ of the additional resistor $R_2$).

These embodiments can further be designed in such a way that the measuring resistor is short-circuited when switching to the overload mode (u). This leads to the fact that with an exemplary electrical resistance ratio $R_{W2}/R_{W1}=1/100$, the load resistance $R_W$ is reduced to about 1/100 of the previous value (the electrical resistances of the further components in the resistor arrangement, in particular the coil, are not taken into account in this simplified example). The output stage can now deliver up to a hundred times the overload coil current compared to the measuring mode, in order to compensate for the relative movement between the magnet and coil sought by the overload. Other resistance ratios or types of resistance reduction do not influence the basic inventive principle, but at most cause other maximum compensation currents $I_{Lu}$.

The voltage tapped at the additional resistor $W_2$ is fed to the second A/D converter and evaluated. The achievable resolution for determining the overload force with the help of the second A/D converter is significantly lower due to the lower electrical resistance $R_{W2}$, but the load measurement range is considerably extended. With the resistance ratio $R_{W2}/R_{W1}=1/100$ mentioned as an example above, an overload force $F_u$ could be quantitatively determined that is up to one hundred times greater than a force $F_m$ determined in the measuring mode by means of the measuring resistor $W_1$ and the first A/D converter and lying within the specified load range.

Implementations of the invention change, in particular reduce, the electrical resistance $R_W$ of the resistor arrangement W (load resistance) in the event of an overload, in order to be able to provide a higher coil current in the overload mode (u) compared to the measuring mode (m) with a predetermined and preferably unchangeable maximum power capability of the output stage.

Different variants for changing the electrical resistance $R_W$ are possible within the scope of the present invention, and in principle any electrical component forming the load resistance can be used to reduce the overall load resistance by influencing its electrical resistance. According to some embodiments of the invention, the electrical measuring resistor $R_{W1}$, which together with the coil L and possibly other components forms the electrical resistance $R_W$ of the resistor arrangement W, is reduced, since this also reduces the measuring resistor voltage $U_{W1}$ tapped at the measuring resistor $W_1$ and fed to a first A/D converter for evaluation.

The measuring resistor $W_1$ can be reduced, for example, a) by switching the coil current to an additional resistor $W_2$ with lower electrical resistance $R_{W2}$ which is different from the measuring resistor $W_1$ ($R_{W1}>R_{W2}$), so that the measuring resistor $W_1$ is replaced by the additional resistor $W_2$ in terms of circuitry, or b) by connecting an additional resistor $W_2$ in parallel with the measuring resistor $W_1$ so that the coil current is divided between the two resistors, or c) by at least two series-connected individual resistors together forming the measuring resistor $W_1$ and at least one of these individual resistors being reduced or short-circuited.

For the purposes of this application, "reduction" of a resistor means the reduction of its electrical resistance. Some circuit examples are shown in the figures. However, the skilled person is not limited to the aforementioned examples and can also select other circuit variants to reduce the electrical measuring resistance $R_{W1}$. Instead of reducing the measuring resistor $W_1$, the load resistance W can also be changed, in particular reduced, by changing other electrical components within the resistor arrangement, while the coil current through the measuring resistor remains unchanged, for example. Although the measuring resistor voltage $U_{W1}$ at the first A/D converter cannot be used differently in this case than in the measuring mode, the electrical resistance $R_W$ of the resistor arrangement W as a whole is reduced so that the output stage can also supply a higher coil current $I_{Lu}$ in this case. A second A/D converter with a suitable load measuring range could then detect a higher current corresponding to the overload force with the aid of an auxiliary voltage $U_H$— as described above—and evaluate it to output a signal corresponding to the overload force.

The size of the maximum deliverable coil current at a given output stage power is based on the total electrical resistance of the resistor arrangement. A preferably selected reduction of the resistance when switching to the overload mode by, for example, 20% changes the maximum possible coil current by a factor of 1.25. A preferably selected reduction of 50% doubles the maximum possible coil current accordingly. In this case, compared to the regular measuring mode, a compensation force twice as large can be generated at the coil, which can be evaluated to determine the overload force. According to an even more preferred embodiment, the electrical resistance of the resistor arrangement is reduced by at least 80%, and particularly preferably by at least 90%. Most preferably, the reduction is even 95% or more. In the latter case, the scale would be designed to compensate for an overload force $F_u$ corresponding to 20 times the maximum force $F_m$ expected and compensated in the measuring mode.

In some implementations it is expedient to design the output stage in such a way that the current $I_L$ flowing through the resistor arrangement W in the measuring mode (m) can at least double, preferably quintuple, most preferably multiply by twenty in the overload mode (u).

A particularly advantageous feature in some implementations of the invention is that the switchover from the measuring mode to the overload mode can take place with suitable output stage control without significant change of the coil current. If an (imminent) overload is detected in the measuring mode (m) on the basis of the measured coil current $I_L$ (e.g. by exceeding a predetermined voltage threshold value at the measuring resistor $W_1$), the reduction of the load resistance and thus the switchover to the overload mode (u) can take place immediately by a simple switching operation according to one of the examples described above. Since the load to be compensated does not change at the actual moment of switching, the required "overload" coil current $I_{Lu}$ must first match the coil current $I_L$ before switching. From the relationship $U_E=(I_L$ or $I_{Lu})·R_W$, it follows with now reduced load resistance $R_W$ and unchanged coil current that the control must reduce the output voltage of the output stage accordingly quickly in order to continue to supply the (unchanged) coil current $I_{LU}$. Preferably, the changeover is "seamless", i.e. without significant fluctuations in the coil current.

A scale in accordance with the present invention may be equipped with a coil current control which is designed in such a way that the required coil current is set correctly again within a very short time after switching (and the change in resistance that occurs). This means that the control "recognises" the reduced load resistance very quickly and adjusts the output stage voltage accordingly quickly in order to generate the necessary compensation current through the coil again. This minimises the relative movement between the solenoid and the coil immediately after switching and ensures almost uninterrupted detection of the respective load.

According to some embodiments of the invention, the scale is designed, for example, in such a way that the coil current $I_{Lu}$ readjusts to the required compensation current within less than 500 ms, preferably less than 200 ms, most preferably less than 50 ms from the moment of switching, in order to compensate for possible relative movements between the magnet and the coil within a very short time. This enables the quasi-continuous detection of a force acting on the load cell while it changes from a load range intended for the normal measuring mode to an overload force. The same applies to the reverse case, that an overload force reduces into the load range provided for in the normal measuring mode. (In an idealised view, the compensation current—as explained above—is identical before and after switching, $I_{lm}=I_{Lu}$. However, this is based on the simplified assumption that within a very short time window, starting with the moment of switching, the load and thus the required compensation current does not change or changes only insignificantly. Of course, an overload applied abruptly or within a few milliseconds in normal measuring mode (m) would lead to a voltage with a steep gradient tapped at the measuring resistor, which would continue to rise sharply after reaching the switching threshold and would require a correspondingly increasing compensation current. The condition $I_{lm}=I_{Lu}$ would only be given for an infinitesimally small time window, which includes the switching moment. The design of the appropriate coil current control is within the capability of one of ordinary skill in the field of control technology.

An overload force in the sense of the present invention is defined by the fact that it exceeds, but also falls below, a load range provided for in the regular measuring operation or measuring mode (m). For example, a tensile force inadvertently applied to the load receptor against the usual load direction could fall below the intended load measuring range. Such a force is also to be understood as an overload force in the sense of the invention and its effect on the scale as an overload.

The modification of the load resistance according to the invention is mainly aimed at reducing it in order to be able to call up a higher coil current at the output stage. However, it is also possible for the load resistance to be increased, for instance, in order to be able to read a voltage that is then picked up along the resistor arrangement with greater accuracy.

The reduction in load resistance according to the invention is preferably carried out by one or more electrical or electronic switching processes. The components used to carry out these switching operations can be different components known to the skilled person. Physically and, for example, manually operable switches are possible. The term "switch" in this context is to be understood as any conceivable type of hardware that is suitable for generating the load resistance reduction according to the invention. This also includes, for example, semiconductor switches, relays, (field-effect) transistors or potentiometers.

Preferably, some of the electronic components described above, in particular the switches and/or resistors, can also be actuated and/or adjusted manually or automatically, for example software-controlled, if required, in order to be able to precisely set or adapt the desired configuration depending on the application.

In some embodiments the load resistor is at least partially formed by several coils, which are preferably connected in series and can optionally be connected to or disconnected from the load resistor. Coils, however, have the disadvantage that their resistance is often strongly temperature-dependent and can therefore have a detrimental influence on the measurement result.

These and other aspects, advantages, and features of the invention will be apparent from the following description of representative embodiments, considered along with the accompanying drawings.

DESCRIPTION OF REPRESENTATIVE EMBODIMENTS

Figure 1:
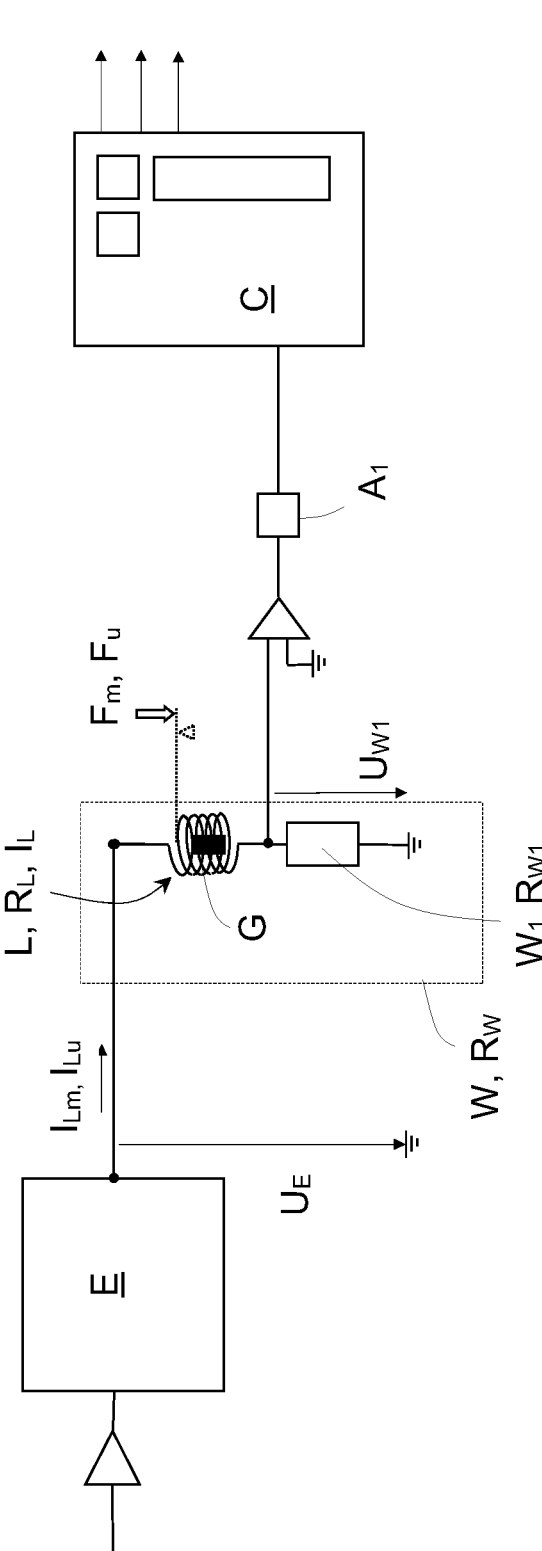
FIG. 1 shows a magnetic coil system of a prior art scale.

FIG. 1 shows a simplified schematic representation of the measuring system of a prior art scale that operates according to the principle of electrodynamic force compensation. A force $F_m$ lying in an intended load measuring range or an overload force $F_u$ lying outside this load measuring range acts—for example via a lever—on a coil L, which can move relative to a stationary magnet G. In this example, the magnet G is stationary and the coil L is coupled to the lever. In the unloaded state, coil L and magnet G are in an initial position relative to each other. A coil current $I_L$ is provided by an output stage E with the aid of an unspecified position sensor and a controller by regulating the output stage voltage $U_E$, which current flows through the coil L and a measuring resistor $W_1$ connected in series with the coil. The coil current $I_L$ generates a compensating force through electrodynamic interaction with the magnet G, which compensates for the deflection of the coil relative to the magnet caused by the force $F_m$, $F_u$ and forces the coil back to its initial position.

In a measuring mode (m) representing the regular operation of the scale, forces $F_m$ are measured which are within a predetermined load measuring range. For this purpose, a measuring resistor voltage $U_{W1}$ dependent on the coil current $I_L$ is tapped at the measuring resistor $W_1$ and fed via an amplifier not specified in more detail to a first A/D converter $A_1$ with an associated load measuring range $B_{A1}$. The signals output by the first A/D converter $A_1$ are fed to a control unit C for evaluation and output of a weight value corresponding to the force $F_m$, $F_u$.

The coil L with its electrical coil resistance $R_L$ and the measuring resistor $W_1$ with its electrical measuring resistance $R_{W1}$ have the coil current $I_L$ flowing through them in series and together form a resistor arrangement W, also called a load resistor, with an electrical resistance $R_W$. Taking into account the maximum available power $P_E$ of the output stage ($P_E = U_E \cdot I_L$), the coil current is determined and limited by the output stage voltage $U_E$ and the load resistance $R_W$. With a constant load resistance $R_W$, the maximum possible coil current is therefore determined by the output stage E, which in practice is dimensioned in such a way that a sufficient coil current can be provided within an intended load measuring range. For a larger force $F_u$ (overload force) outside this load measuring range, the output stage cannot provide sufficient compensation current, the coil movement cannot be compensated and the measuring resistor voltage cannot be meaningfully evaluated.

In contrast to this prior art arrangement, a scale in accordance with aspects of the present invention is switchable from the measuring mode (m) to an overload mode (u). For this purpose, the electrical load resistance $R_W$ is automatically reduced to enable a higher coil current $I_{Lu}$ with unchanged output stage power. The load resistance is preferably reduced by reducing the electrical measuring resistance $R_{W1}$. Various—not exhaustively listed—solutions for this are described in FIGS. 2-5, in which some repetitive elements shown in FIG. 1 have not been shown again.

Figure 2:
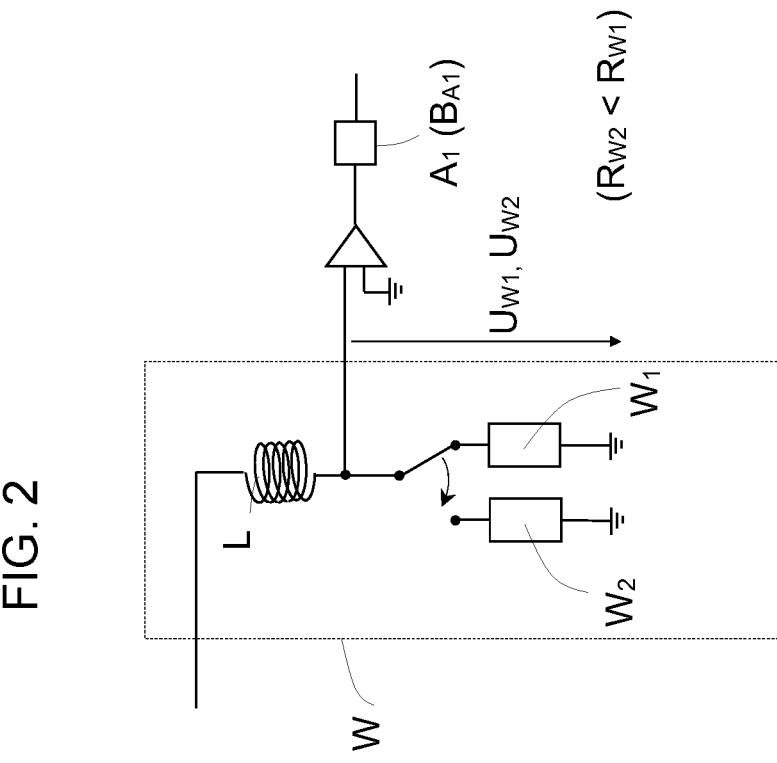
FIG. 2 shows a first embodiment of a circuit for reducing load resistance in accordance with aspects of the invention.

As shown in FIG. 2, it is possible to switch from the measuring resistor $W_1$ to an additional resistor $W_2$ in such a way that the original measuring resistor $W_1$ is completely removed from the resistor arrangement W or its load resistance $R_W$. The coil current is now conducted through the additional resistor $W_2$, the electrical resistance of which $R_{W2}$ is smaller than $R_{W1}$. The voltage to be measured (in the measuring mode it is $U_{W1}$, in the overload mode it is $U_{W2}$) is tapped here above the schematically shown switch. In overload mode, a lower voltage for the first A/D converter $A_1$ is dropped at the additional resistor $W_2$ compared to the previously effective measuring resistor $W_1$, which not only increases the load capacity (a higher coil current can now flow), but also increases the measuring range. Knowing the respective effective electrical resistance values in the resistor arrangement W, the overload can be quantitatively determined with the help of the control unit mentioned in FIG. 1.

Figure 3:
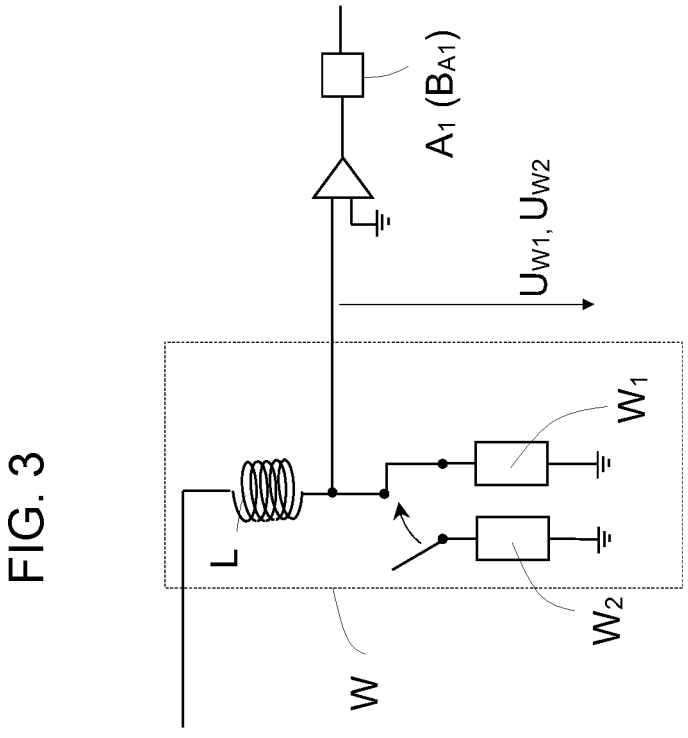
FIG. 3 shows a second embodiment of a circuit for reducing load resistance.

In the solution shown in FIG. 3, the load resistance $R_W$ is reduced by connecting an additional resistor $W_2$ in parallel with the measuring resistor $W_1$. The effects described for FIG. 2 apply here in the same way, wherein the measuring resistor $W_1$ remains part of the resistor arrangement W.

Figure 4:
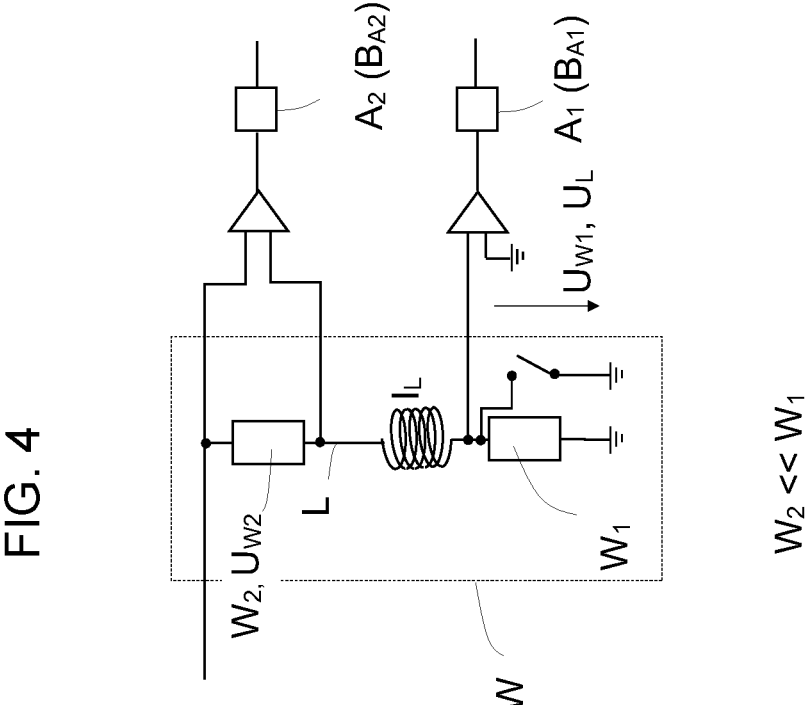
FIG. 4 shows a third embodiment of a circuit for reducing load resistance.

FIG. 4 shows a particularly preferred embodiment of a scale according to the invention, which has already been explained in the above description. In the measuring mode (m), voltage values are tapped at the measuring resistor $W_1$ and fed to the first A/D converter $A_1$ and evaluated with the aid of a control unit C as shown in FIG. 1, which is not shown again here. When switching to overload mode (u), the measuring resistor $W_1$ is short-circuited.

For quantitative detection of an overload force $F_u$, an additional resistor $W_2$ through which the coil current flows is provided in the resistor arrangement W shown the example of FIG. 4. An auxiliary voltage $U_H$ is tapped and evaluated as the additional resistor voltage $U_{W2}$ for a second A/D converter $A_2$ provided separately from the first A/D converter $A_1$. The electrical resistance $R_{W2}$ of the additional resistor $W_2$ is significantly smaller than that of the measuring resistor $W_1$, for example $R_{W1}$ is 50 or 100 times greater than $R_{W2}$. In the simplified representation according to FIG. 4 and neglecting the electrical resistance of the coil L, the load resistance in the overload mode (u) is only formed by the additional resistor $W_2$, which allows a coil current $I_{Lu}$ 50 or 100 times greater (load extension). The additional resistance voltage $U_{W2}$ generated by it and dropping at the additional resistance $W_2$ can be quantitatively evaluated via the second A/D converter $A_2$ and the control unit C (corresponding to control unit C in FIG. 1), whereby 50 or 100 times greater overload forces than in the measuring mode can be both compensated and quantitatively determined.

Figure 5:
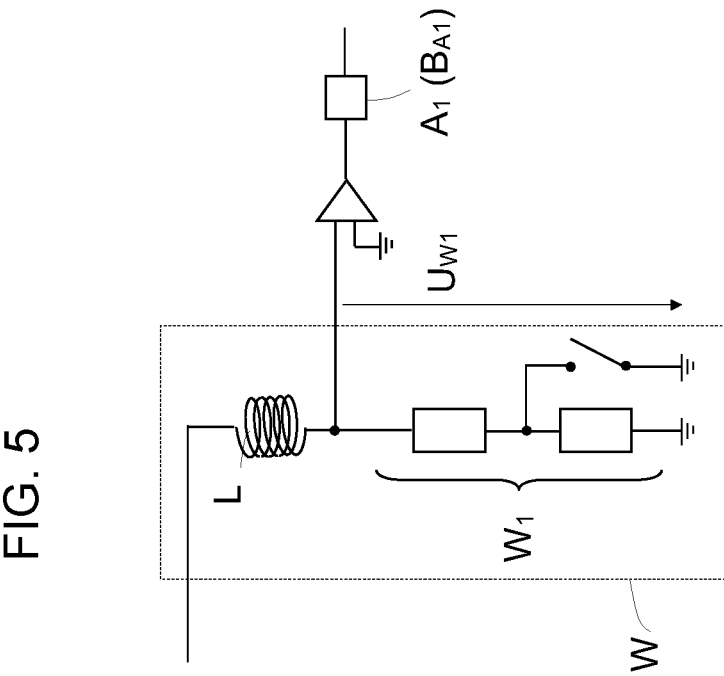
FIG. 5 shows a fourth embodiment of a circuit for reducing load resistance.

The variant according to FIG. 5 shows a measuring resistor $W_1$ which is composed of two serial individual resistors which are not described further. One of these individual resistors can be short-circuited via a switch, which reduces the electrical measuring resistance $R_{W1}$ and thus also the electrical load resistance $R_W$.

As already shown in the example of FIG. 4, instead of the first A/D converter, a second A/D converter $A_2$ can also be used independently of the first A/D converter in order to detect when a threshold value is exceeded, signalling an overload, and/or, in particular, to quantitatively measure overload forces.

Figure 6:
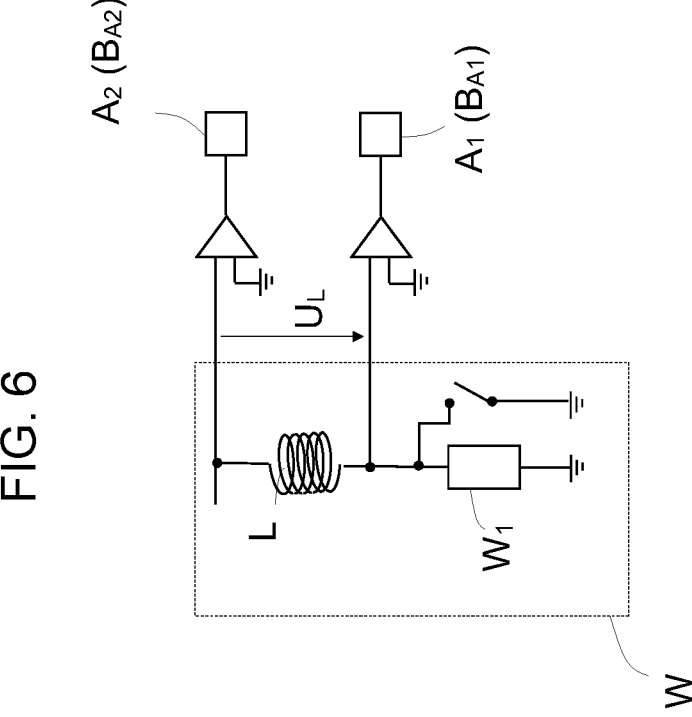
FIG. 6 shows an embodiment of a circuit for reducing load resistance within the scope of the present invention that employs a second A/D converter.

FIG. 6 shows an example in which an additional second A/D converter $A_2$ with an associated load measuring range $B_{A2}$ is supplied with a voltage tapped at the resistor arrangement which differs from the resistance measuring voltage $U_{W1}$ tapped for the measuring mode and results from the electrical coil resistance $R_L$ in the overload mode—unlike in the example according to FIG. 4.

As in the example according to FIG. 4, the second A/D converter according to FIG. 6 can be used independently of the first A/D converter and both in measuring mode (m) and in overload mode (u) to monitor when threshold values are exceeded and to determine the acting forces $F_m$, $F_u$. The load measuring range $B_{A2}$ can encompass the first load measuring range $B_{A1}$ and be set sufficiently large to also quantitatively detect an overload that is no longer in the load measuring range $B_{A1}$ of the first A/D converter, which is only provided here for evaluation in the measuring mode (m). The second load measuring range $B_{A2}$ can also be specially tailored to voltage values above the first load measuring range $B_{A1}$ in order to monitor threshold values or measure the overload forces only in this range. Depending on the type of load resistance reduction, in the circuit according to FIG. 6 at least one coil voltage $U_L$ generated by the coil resistance still drops at the second A/D converter $A_2$ in the overload mode (u).

Figure 7:
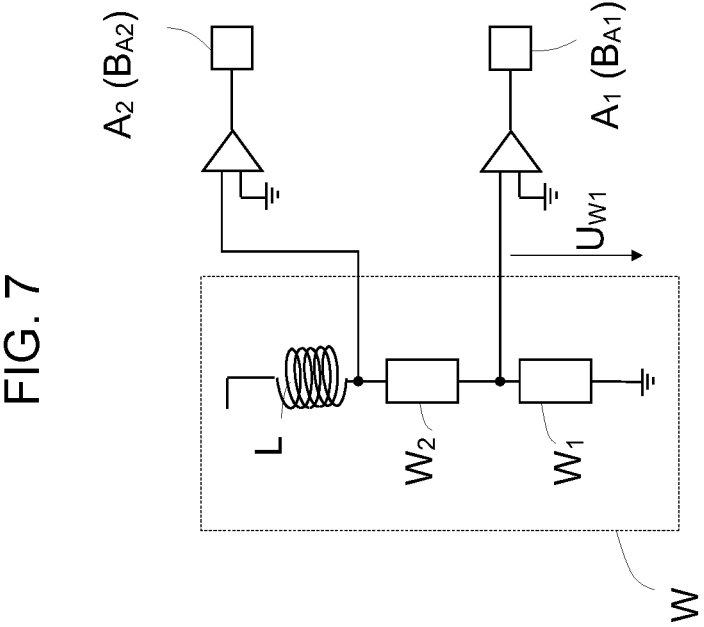
FIG. 7 shows an additional embodiment of a circuit for reducing load resistance employing a second A/D converter.

A modified version is shown in FIG. 7. Here, the second A/D converter $A_2$ is supplied with the voltage that drops across the two resistors $W_1$ (measuring resistor) and $W_2$ (additional resistor) connected in series. If the measuring resistor $W_1$ is reduced or short-circuited by switching to the overload mode (u) (analogous to the example of FIG. 4), the electrical resistance $R_{W2}$ of the additional resistor $W_2$ essentially determines the voltage supplied to the second A/D converter $A_2$.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The directions referenced herein and in the following claims, namely, the x or transport direction, the z or height direction, and the y or width direction refer to the corresponding directions indicated in the drawings relative to the inspection device 1 as oriented therein.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

DESIGNATIONS $W_1$ Measuring resistor
$W_2$ Additional resistor
W Resistor arrangement
$A_1$ First A/D converter
$A_2$ Second A/D converter
C Control unit
E Output stage
$F_m$ Force within a given load range
$F_u$ Force outside the specified load range, overload force
G Magnet
$I_L$ Carrying coil current
$I_{Lu}$ Overload coil current
$I_{Lm}$ Coil current in measuring mode
L Carrying coil
$B_{A1}$ Load measuring range of the first A/D converter A1
$B_{A2}$ Load measuring range of the second A/D converter A2
$R_{W1}$ Electrical resistance of the measuring resistor $W_1$
$R_{W2}$ Electrical resistance of the additional resistor $W_2$
$R_W$ Electrical resistance of the resistor arrangement W (load resistance)
$R_L$ Electrical resistance of the carrying coil L
$U_{W1}$ Measuring resistor voltage
$U_{W2}$ Additional resistor voltage
$U_H$ Auxiliary voltage
$U_E$ Output stage voltage
$U_L$ Coil voltage
(m) Index for measuring mode
(u) Index for overloading mode

The invention claimed is:

1. A scale which operates according to the principle of electrodynamic force compensation, the scale including:
   (a) a carrying coil and a magnet which interact with one another and are movable relative to one another, wherein the carrying coil is connected in a load coil circuit to receive a carrying coil current supplied to the carrying coil from an output stage;

(b) a resistor arrangement which forms an electrical load resistance for the load coil circuit, the resistor arrangement comprising the carrying coil having a coil electrical resistance and a measuring resistor arrangement having a measuring electrical resistance, wherein the scale operates in a measuring mode for a force acting on the scale in a predetermined load measuring range, the electrical load resistance having a measuring mode resistance value when the scale is operating in the measuring mode so that the carrying coil current supplied to the carrying coil by the output stage comprises a carrying coil measuring current to compensate, by electrodynamic interaction between the carrying coil and the magnet, for the force acting on the scale and the scale determines a measured value associated with the force acting on the scale from a measuring voltage drop at the measuring resistor arrangement; and (c) a switching arrangement for switching from the measuring mode to an overload mode for detecting an overload force acting on the scale which exceeds or falls below the predetermined load measuring range, wherein in the overload mode the electrical load resistance is reduced from the measuring mode resistance value and wherein the carrying coil current supplied to the carrying coil by the output stage comprises a carrying coil overload current to compensate, by electrodynamic interaction between the carrying coil and the magnet, for the overload force acting on the scale;

(d) wherein the switching from the measuring mode to the overload mode occurs automatically.

2. The scale of claim 1 wherein when the scale is operating in the overload mode the carrying coil overload current is quantitatively determined by tapping an overload detection voltage within the load coil circuit and feeding the overload detection voltage to an A/D converter.

3. The scale of claim 1 further including a first A/D converter with a first load measuring range to which a voltage representing the measuring voltage drop is fed when the scale is operating in the measuring mode and wherein a transition between a force within the predetermined load measuring range and an overload force outside the predetermined load measuring range is detectable in that the voltage representing the measuring voltage drop exceeds or falls below a predeterminable threshold value for the first load measuring range of the first A/D converter.

4. The scale of claim 1 further including:

(a) a first A/D converter with a first load measuring range to which a voltage representing the measuring voltage drop is fed when the scale is operating in the measuring mode; and (b) a second A/D converter with a second load measuring range to which an auxiliary voltage tapped within the load coil circuit is fed when the scale is operating in the measuring mode, wherein a transition between a force within the predetermined load measuring range and an overload force outside the predetermined load measuring range is detectable in that the auxiliary voltage exceeds or falls below a predeterminable threshold value for the second load measuring range.

5. The scale of claim 4 wherein the second load measuring range of the second A/D converter is selected to be larger than the first load measuring range of the first A/D converter.

6. The scale of claim 1 wherein the electrical load resistance is reduced in the overload mode by short circuiting a measuring resistor in the measuring resistor arrangement.

7. The scale of claim 1 wherein the electrical load resistance is reduced in the overload mode by replacing a measuring resistor in the measuring resistor arrangement with an additional resistor having an electrical resistance less than the measuring resistor.

8. The scale of claim 1 wherein the electrical load resistance is reduced in the overload mode by connecting an additional resistor in parallel with a measuring resistor of the measuring resistor arrangement.

9. The scale of claim 1 wherein the electrical resistance of the resistor arrangement is reduced by at least 50% in the overload mode.

10. The scale of claim 1 wherein the electrical resistance of the resistor arrangement is reduced by at least 80% in the overload mode.

11. The scale of claim 1 wherein the electrical resistance of the resistor arrangement is reduced by at least 90% in the overload mode.

12. The scale of claim 1 wherein the electrical resistance of the resistor arrangement is reduced by at least 95% in the overload mode.

13. The scale of claim 1 further including a first A/D converter with a first load measuring range to which a voltage representing the measuring voltage drop is fed when the scale is operating in the measuring mode and wherein:

(a) the scale is operable to switch to the overload mode when a measured value exceeds a predefined first threshold value to signal an overload, in order to (i) feed a reduced measuring resistor voltage to the first A/D converter for determining the overload force, or (ii) supply an auxiliary voltage tapped at the resistor arrangement to a second A/D converter with a second load measuring range for determining the overload force; and (b) the scale is operable to switch back from the overload mode to the measuring mode when the measured value falls below the predefined first threshold value or a predefined second threshold value different from the predefined first threshold value.

14. The scale of claim 1 wherein the output stage is operable to at least double the current flowing through the resistor arrangement when the scale is operating in the overload mode as compared to the current flowing through the resistor arrangement when the scale is operating in the measurement mode.

15. The scale of claim 1 upon switching between the measuring mode and the overload mode the carrying coil current adjusts to a required compensation current within less than 500 ms from the time of switching.

16. A method for operating a scale according to the principle of electrodynamic force compensation, wherein the scale includes, (i) a carrying coil and a magnet which interact with one another and are movable relative to one another, wherein the carrying coil is connected in a load coil circuit to receive a carrying coil current supplied to the carrying coil from an output stage; and (ii) a resistor arrangement which forms an electrical load resistance for the load coil circuit, the resistor arrangement comprising the carrying coil having a coil electrical resistance and a measuring resistor arrangement having a measuring electrical resistance, wherein the scale operates in a measuring mode for a force acting on the scale in a predetermined load measuring range, the electrical load resistance having a measuring mode resistance value when the scale is operating in the measuring mode so that the carrying coil current supplied to the carrying coil by the output stage comprises a carrying coil measuring current to the carrying coil to compensate, by electrodynamic interaction between the carrying coil and the magnet, for the force acting on the scale and the scale determines a measured value associated with the force acting on the scale from a measuring a voltage drop at the measuring resistor arrangement, the method including:

(a) detecting an overload force that exceeds or falls below the predetermined load measuring range; and (b) switching to an overload mode in which the electrical load resistance is reduced from the measuring mode resistance value to minimize relative movement between the magnet and carrying coil, wherein the switching to the overload mode occurs automatically.

17. The method of claim 16 wherein after switching to the overload mode the output stage supplies the carrying coil with a carrying coil overload current which compensates for the overload force in order to evaluate a measured variable which is dependent on the overload coil current and determine the overload force, the measured variable comprising a voltage supplied to an A/D converter.

18. The method of claim 16 wherein the electrical load resistance is reduced by short circuiting a measuring resistor in the measuring resistor arrangement.

19. The method of claim 16 wherein the electrical load resistance is reduced by replacing a measuring resistor in the measuring resistor arrangement with an additional resistor having an electrical resistance less than the resistance of the measuring resistor.

20. The method of claim 16 wherein the electrical load resistance is reduced by connecting an additional resistor in parallel with a measuring resistor of the measuring resistor arrangement.

* * * * *